(12) United States Patent
Williams

(10) Patent No.: US 10,310,146 B2
(45) Date of Patent: Jun. 4, 2019

(54) NANOCOMPOSITE GRADIENT REFRACTIVE-INDEX FRESNEL OPTICAL-ELEMENT

(71) Applicant: Vadient Optics, LLC., Beaverton, OR (US)

(72) Inventor: George Williams, Portland, OR (US)

(73) Assignee: Vadient Optics, LLC, Beaverton, OR (US)

(*) Notice: Subject to any disclaimer, the term of this patent is extended or adjusted under 35 U.S.C. 154(b) by 0 days.

(21) Appl. No.: 14/299,777

(22) Filed: Jun. 9, 2014

(65) Prior Publication Data

US 2015/0355389 A1    Dec. 10, 2015

(51) Int. Cl.
| | |
|---|---|
| G02B 3/00 | (2006.01) |
| G02B 3/08 | (2006.01) |
| G02B 1/04 | (2006.01) |

(52) U.S. Cl.
CPC .......... *G02B 3/0087* (2013.01); *G02B 1/041* (2013.01); *G02B 3/08* (2013.01)

(58) Field of Classification Search
CPC ......... G02B 3/0087; G02B 1/041; G02B 3/08
USPC ....................................................... 359/615
See application file for complete search history.

(56) References Cited

U.S. PATENT DOCUMENTS

| | | |
|---|---|---|
| 5,498,444 A | 3/1996 | Hayes |
| 5,707,684 A | 1/1998 | Hayes et al. |
| 5,800,000 A | 9/1998 | Shockley |
| 5,807,906 A | 9/1998 | Bonvallot et al. |
| 6,593,415 B2 | 7/2003 | Koike et al. |
| 6,656,990 B2 | 12/2003 | Shustack et al. |
| 6,805,902 B1 | 10/2004 | Hayes |
| 6,836,371 B2 | 12/2004 | Lai et al. |
| 6,934,088 B2 | 8/2005 | Lai et al. |
| 6,976,641 B2 | 12/2005 | Lai et al. |
| 7,046,439 B2 | 5/2006 | Kaminsky et al. |
| 7,110,649 B2 | 9/2006 | Hisatomi |
| 7,420,743 B2 | 9/2008 | Lai et al. |
| 7,473,721 B2 | 1/2009 | Harada et al. |
| 7,918,555 B2 | 4/2011 | Sverdrup et al. |
| 2009/0201572 A1* | 8/2009 | Yonak ............ G02B 1/00 359/316 |

(Continued)

FOREIGN PATENT DOCUMENTS

| | | |
|---|---|---|
| EP | 2412767 A1 | 2/2012 |
| EP | 2474404 A1 | 6/2012 |

(Continued)

OTHER PUBLICATIONS

T. Suhara, et. al., "Graded-Index Fresnel Lenses for Integrated Optics", Applied Optics, V.21, 1966-1971 (1982).*

(Continued)

*Primary Examiner* — Wen Huang

(57) ABSTRACT

A nanocomposite optical-element comprising a first surface, a second surface, and a nanocomposite between the first and the second surface. The nanocomposite comprising of a plurality of refractive-gradients, the plurality of refractive-gradients comprising one or more nanofillers dispersed in a cured organic-matrix. The nanofillers concentration variation determining the plurality of refractive-gradient profiles such that a profile discontinuity exists between any of the plurality of refractive-gradients that are adjacent.

30 Claims, 9 Drawing Sheets

(56) References Cited

U.S. PATENT DOCUMENTS

| | | | |
|---|---|---|---|
| 2011/0251686 A1* | 10/2011 | Masket | A61F 2/1613 623/6.43 |
| 2014/0003777 A1 | 1/2014 | Sengupta | |
| 2015/0021528 A1 | 1/2015 | Chartoff et al. | |
| 2015/0023643 A1 | 1/2015 | Chartoff et al. | |

FOREIGN PATENT DOCUMENTS

| | | |
|---|---|---|
| EP | 2469309 B1 | 8/2013 |
| EP | 2392473 B1 | 9/2013 |
| JP | PCT/JP2013/000774 | 2/2013 |
| WO | PCT/US1996/014535 | 9/1996 |

OTHER PUBLICATIONS

ISA/US, PCT Written Opinion of the International Searching Authority for PCT/US2015/052708, dated Dec. 14, 2015.

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.

Richard Chartoff, et al., Polymer Matrix Nanocomposites by Inkjet Printing, Solid Freeform (SFF) symposium, [online], 2005, pp. 174-183, [retrieved on Apr. 23, 2015]. from the Internet: <http://sffsymposium.engr.utexas.edu/Manuscripts/2005/2005-16-Chartoff.pdf>.

* cited by examiner

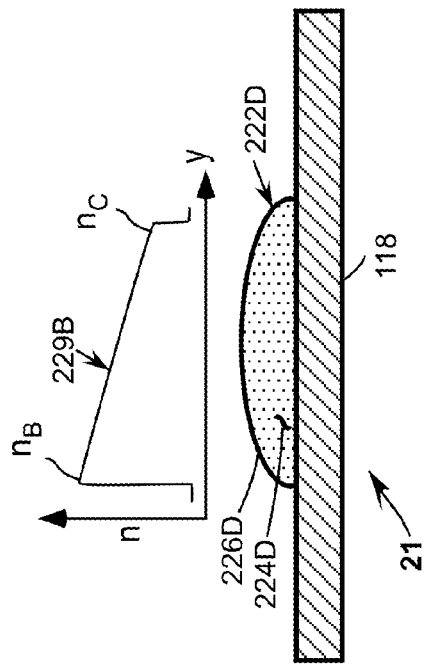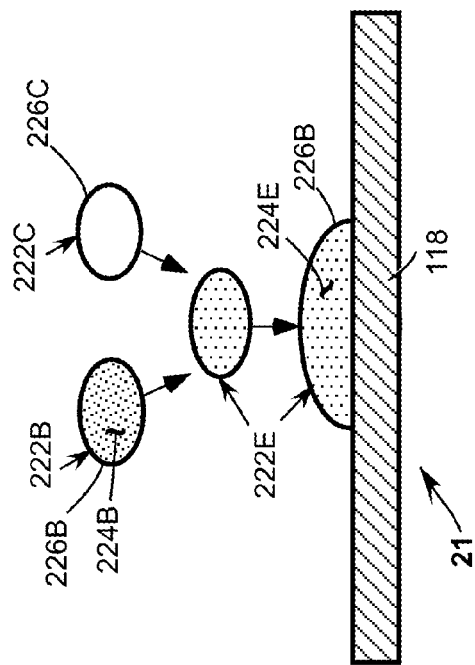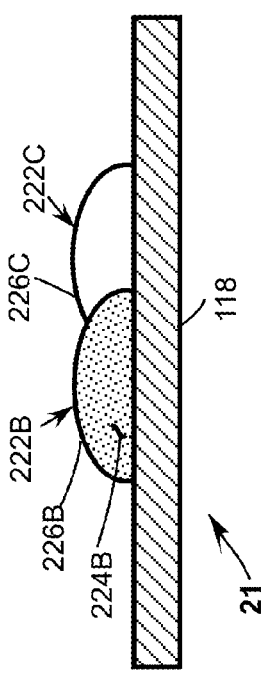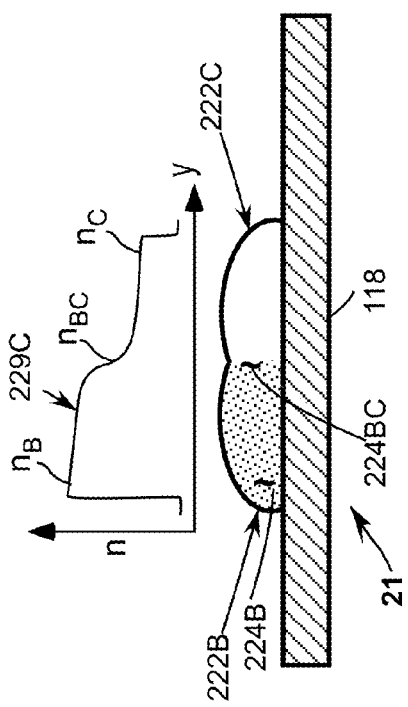

NANOCOMPOSITE GRADIENT REFRACTIVE-INDEX FRESNEL OPTICAL-ELEMENT

TECHNICAL FIELD OF THE DISCLOSURE

The present disclosure relates in general to refractive based optics. The disclosure relates in particular to nanocomposite gradient refractive-index optical-elements, made with ink jet printable nanocomposite materials.

DISCUSSION OF BACKGROUND ART

Conventional refractive lenses refract light at the surfaces of a bulk material, such as glass, in order to bend and light. For any single conventional refractive optic there are at least two surfaces in which refraction occurs. Between the surfaces is bulk material, the thickness of the bulk material dependent, in part, on the shape of the two surfaces. Fresnel optics reduce the amount of bulk material by dividing the lens surface into concentric annular sections, and corresponding stepwise discontinuities, between the sections, such that the lens shape is maintained at reduced thickness. Generally, the more annular sections, the thinner the Fresnel lens. This application relates to another approach.

SUMMARY OF THE DISCLOSURE

The present disclosure is directed to nanocomposite refractive-gradient optical-elements. In one aspect, an optical-element in accordance with the present disclosure comprises of a nanocomposite optical-element comprising a first surface, a second surface, and a nanocomposite between the first and the second surface. The nanocomposite comprising of a plurality of refractive-gradients, the plurality of refractive-gradients comprising one or more nanofillers dispersed in a cured organic-matrix, the nanofillers concentration variation determining the plurality of refractive-gradient profiles such that a profile discontinuity exists between any of the plurality of refractive-gradients that are adjacent.

BRIEF DESCRIPTION OF THE DRAWINGS

The accompanying drawings, which are incorporated in and constitute a part of the specification, schematically illustrate preferred embodiments of the present invention, and together with the general description given above and the detailed description of preferred methods and embodiments, given below, serve to explain principles of the present disclosure.

FIG. 2G is a cross-section view, schematically illustrating deposition of the nanocomposite-ink side-by-side.

FIG. 2H is a cross-section view, schematically illustrating that shown in FIG. 2G, where nanocomposite-ink mixing resulted in a slow transition in the refractive-gradient profile.

FIG. 2I is a cross-section view, schematically illustrating that shown in FIG. 2G, where nanocomposite-ink mixing resulted in a fast transition in the refractive-gradient profile.

FIG. 2J is a cross-section view, schematically illustrating mixing of nanocomposite-inks in air.

DETAILED DESCRIPTION

Figure 1A:
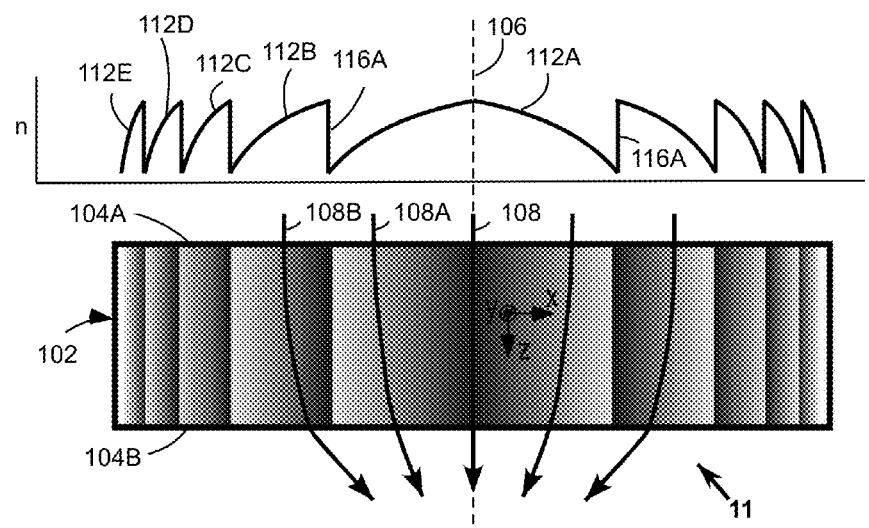
FIG. 1A cross-section view of a nanocomposite optical-element in accordance with the present disclosure, with positive optical power, comprising a first surface, a second surface, and a nanocomposite between the first and the second surface, the nanocomposite comprising of a plurality of refractive-gradients, the plurality of refractive-gradients comprising one or more nanofillers dispersed in a cured organic-matrix, the nanofillers concentration variation determining the plurality of refractive-gradient profiles such that a profile discontinuity exists between any of the plurality of refractive-gradients that are adjacent.

Referring now to the drawings, wherein like components are designated by like reference numerals. Drawings are characterized by Cartesian (mutually perpendicular) axes x, y, and z. Although anyone skilled in the art can transform the axis to other coordinates or topologies. When referring to an optical-element, the z-axis refers generally to the direction of light propagation, and x and y being transverse axes. Methods of manufacture and preferred embodiments of the present disclosure are described further herein below.

Figure 1B:
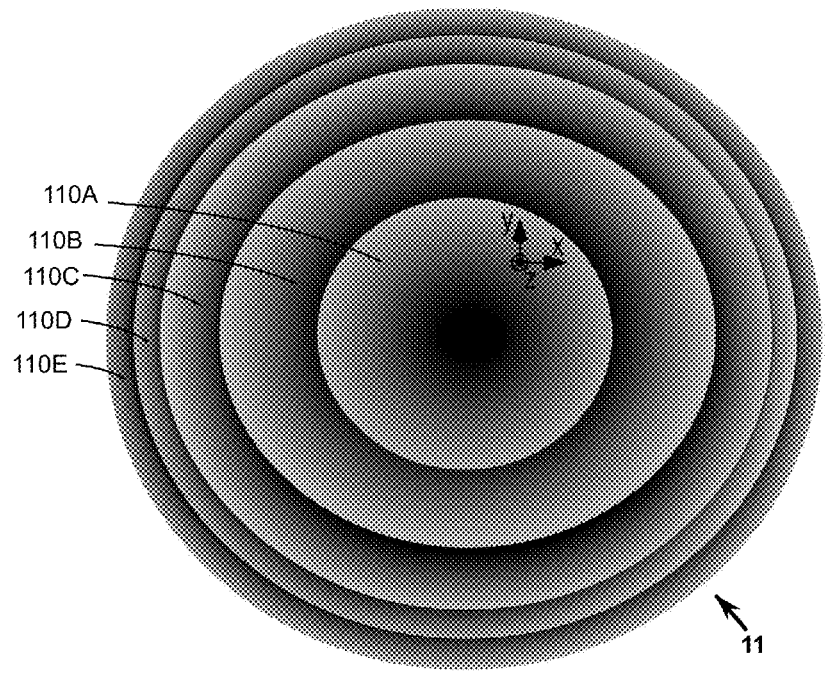
FIG. 1B is a plan view of that shown in FIG. 1A.

FIG. 1A and FIG. 1B illustrate an optical-element 11, in accordance with the present disclosure. Optical-element 11 comprises of a first surface 104A, a second surface 104B and a nanocomposite 102, the nanocomposite between the two surfaces. Nanocomposite 102 comprises of a plurality of refractive-gradients. The refractive-gradients comprising of, one or more, nanofillers dispersed in a cured organic-matrix. The nanofillers concentration variation determining the plurality of refractive-gradient profiles such that a profile discontinuity exists between any of the plurality of refractive-gradients that are adjacent. Here, a refractive-gradient 110A, 110B, 110C, 110D, and 110E are annular with a respective refractive-gradient profile 112A, 112B, 112C, 112D, and 112E, wherein each of the refractive-gradients that are adjacent having a discontinuity between. By way of example, a discontinuity 116A divides refractive-gradients 110A and 110B. The plurality of refractive-gradients have respective refractive-gradient profiles 112A, 112B, 112C, 112D, and 112E each the refractive-gradient profiles having radially decreasing concentration of nanofillers, thereby each having radially decreasing refractive-index. The nanofillers concentration is darker being of higher concentration and lighter being of lower concentration.

Optical-element 11, in accordance with the present disclosure, has positive optical power. A light ray 108, 108A, and 108C propagate parallel to an optical-axis 106 and enter the optical-element at a first surface 104A. Optical-axis 106 being aligned in the z-direction. First surface 104A being an air-nanocomposite interface, flat, and transverse to optical-axis 106. Ray 108 propagates collinear with the optical axis, entering the optical-element at first surface 104A and travels through the nanocomposite, exiting the optical-element via a second surface 104B collinear with the optical-axis. Surface 104B being a nanocomposite-air interface, flat, and transverse to the optical-axis. Ray 108A propagates parallel with the optical axis and enters optical-element 11 via first surface 104A and into refractive-gradient 110A, where the refractive-gradient refracts the ray towards the optical-axis, exiting the optical-element via second surface 104B propagating at an angle towards the optical-axis. Ray 108B propagates parallel with the optical axis and enters optical-element 11 via first surface 104A and into refractive-gradient 110B, where the refractive-gradient refracts the ray towards the optical-axis, exiting the optical-element via second surface 104B propagating at an angle towards optical-axis 106.

Figure 1C:
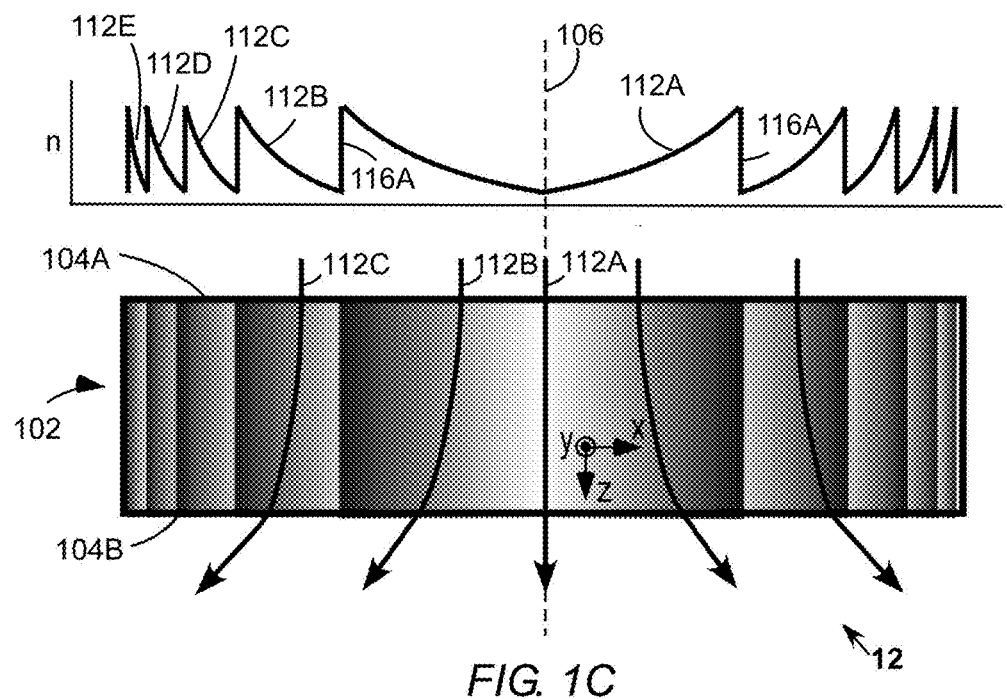
FIG. 1C is a cross-section view of a negative optical-element in accordance with the present disclosure.
Figure 1D:
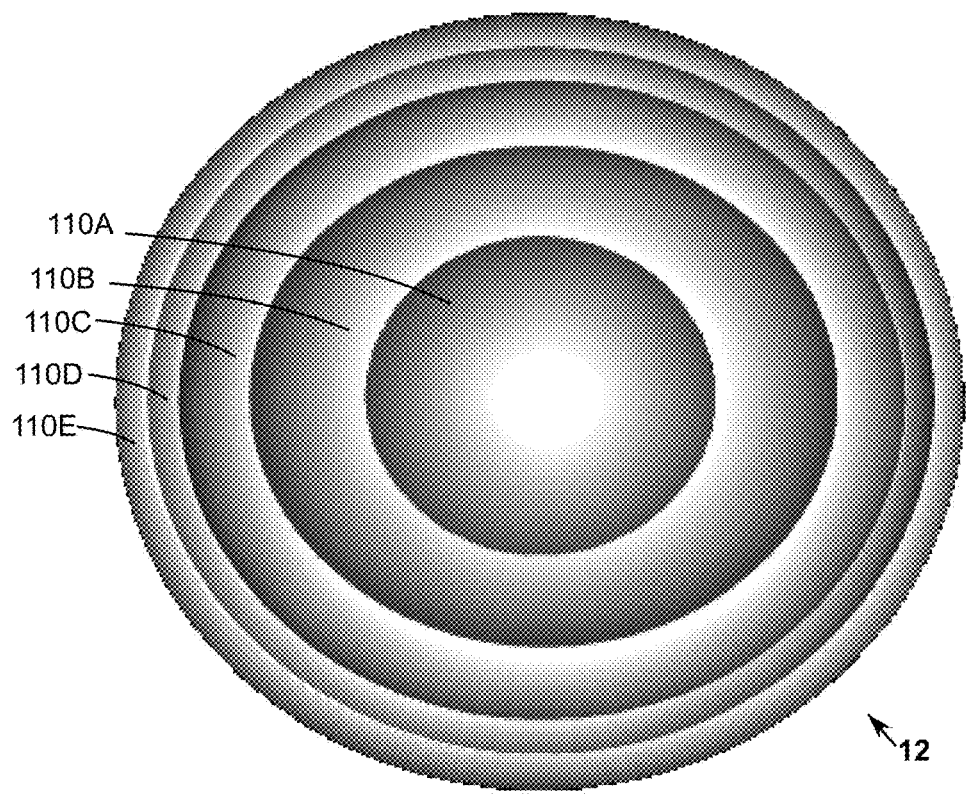
FIG. 1D is a plan view of that shown in FIG. 1C

FIG. 1C and FIG. 1D illustrate an optical-element 12, in accordance with the present disclosure. Optical-element 12 has all the features of optical-element 11 of that shown in FIG. 1A and FIG. 1B, except here a plurality of refractive-gradients and respective refractive-gradient profiles 112A, 112B, 112C, 112D, and 112E have radially increasing, instead of decreasing, concentration of nanofillers, thereby each have a radially increasing refractive-index with any refractive-gradient.

Optical-element 12, in accordance with the present disclosure, has negative optical power. Light rays 108, 108A, and 108C propagating parallel to optical-axis 106 enter the optical-element at first surface 104A. Ray 108 propagates along the optical-axis, entering and exiting the optical-element as described above. Ray 108A propagates parallel with the optical axis and enters optical-element 11 via first surface 104A and into refractive-gradient 110A, where the refractive-gradient refracts the ray away from the optical-axis, exiting the optical-element via second surface 104B propagating at an angle away from the optical-axis. Ray 108B propagates parallel with the optical axis and enters optical-element 11 via first surface 104A and into refractive-gradient 110B, where the refractive-gradient refracts the ray away from the optical-axis, exiting the optical-element via second surface 104B propagating at an away from optical-axis 106.

Refraction at the first and second surface of the optical-element will depend on the wavelength of light, angle of incidence and refractive-index of the nanocomposite in which it enters and exits. For any interference refraction of light obeys Snell's law, described as:

$$n_1 \sin(\theta_1) = n_2 \sin(\theta_2),$$

where $n_1$ and $n_2$ are respectively, the refractive-index of the first and second material, $\theta_1$ is the angle-of-incidence, and $\theta_2$ is the angle of refraction into the second material, both angles measured from normal to the interface. Both the refractive-index terms are themselves a function of wavelength. Within the optical-element, refraction depends on the refractive-gradients profile. One mathematical description of the refractive-gradients profiles with axially symmetric profiles is $$N(r,z) = \Sigma_{i=0}^{\infty} r^{2i} (\Sigma_{j=0}^{\infty} N_{ij} z^j),$$

where z is the distance along the optical-axis, r is the radial distance from the optical-axis, and $N_{ij}$ are the coefficients of refraction polynomial. The $N_{ij}$ values gives a large degree of freedom to design the refractive-gradients within the optical-element. In focusing refractive-gradient optics, such as a Wood lens, the isoindicial surfaces of a radial gradient are cylinders centered about the optical axis; consequently, all z terms are equal to zero and the polynomial for a radial gradient can be written as $(r) = N_{00} + N_{10}r^2 + N_{20}r^4 + \ldots$. For purposes of the optical-element that has the axially symmetric profile, the equation must be divided into boundaries based on the position of discontinuities, dividing the refractive-gradients into respective annular sections. For the optical-elements that have refractive-gradients that are arbitrary in position, nanofiller concentration, or not axially symmetric, numerical methods must be used to compute any particular optical-ray path. Methods of manufacturing the optical-element are described below.

Figure 2A:
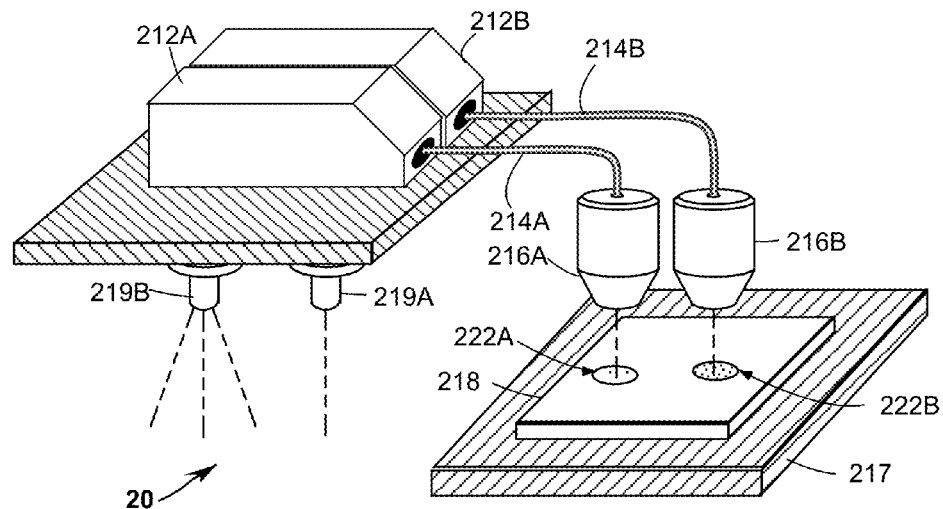
FIG. 2A is a perspective view, schematically illustrating an inkjet printer for printing nanocomposite-ink.

A preferred method of manufacture for the optical-element is by ink jet printing technology. FIG. 2A shows an ink jet printing apparatus 20 for deposition of nanocomposite-ink in accordance with the present disclosure. Printing apparatus 20 is simplified for explanatory purposes. Those skilled in the art will generally recognize the ink jet printing approach, see Richard Chartoff et al., "Functionally Graded Polymer Matrix Nano-Composites by Solid Freeform Fabrication," presented at the 2003 Solid Freeform (SFF) symposium and Richard Chartoff et al., "Polymer Matrix Nano-composites by Ink jet Printing" presented at the SFF symposium in 2005, both incorporated by reference in their entireties for the purpose of explaining nanocomposite ink jet printing.

Printing apparatus 20 has a reservoir 212A and 212B that hold a nanocomposite-ink 222A and 222B, respectively. Reservoirs 222A and 222B provide a printing-head 216A and 216B with nanocomposite-ink 222A and 222B via a feed-line 214A and 214B, respectively. Printing-heads 216A and 216B deposit nanocomposite-ink 222A and 222B, on substrate 218 at particular voxels, thereby forming a nanocomposite structure, such as the optical-elements of the present disclosure. Voxels refer to positions in three-dimensional space. A tage 217 positions a substrate 218, with respect to the printing-heads, for deposition of the nanocomposite-inks at particular voxels.

Substrate 218 can be, or be made, from the group comprising plastics, glasses, metals, ceramics, organic resins, optics, molds, electronic circuits, light sources, wafers, and wafers with integrated electronics. Substrate 218 can become part of the optical element or alternatively the optical-element may be removed from the substrate. For applications in which the substrate becomes part of the optical-element, the substrate may be chosen for specific properties. For example, in applications where the optical-element will become integrated with a light source, the substrate material may be the light source. The optical-element could correct an some aspect of an optical system the substrate could be one of the components in the optical system. Alternatively, the substrate may be a mold material with anti-sticking properties, allowing removal of the optical-element from the mold.

After deposition of nanocomposite-ink from one of the printing-heads, substrate 218 can be positioned with respect to a radiation source 219A for selective-curing of the nanocomposite-ink, at voxels. Selective-curing refers to localized radiation about voxels, activating the organic-matrix. Activation of the organic-matrix solidifies the nanocomposite-ink thereby forming the nanocomposite. Selective-curing means zero-curing, partial-curing, or fully-curing, which respectively means not solidifying, partially solidifying, or fully solidifying the nanocomposite-ink. Another radiation source 219B flood cures the nanocomposite-ink on the substrate. Flood curing is desirable when the all the nanocomposite-ink needs to be partially or fully cured.

Figure 2B:
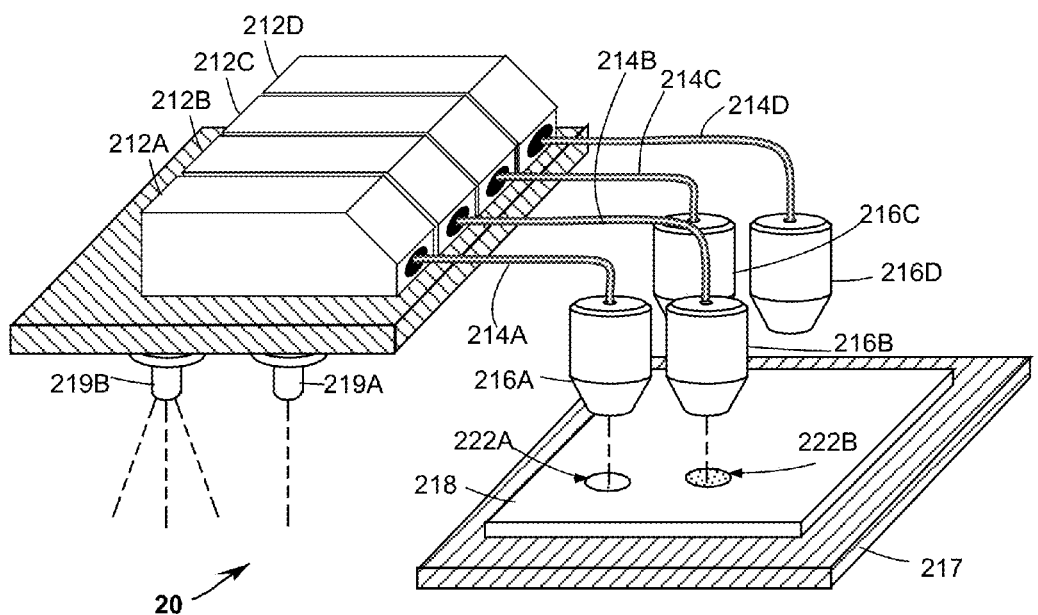
FIG. 2B is a perspective view of that shown in FIG. 2A with two additional printheads.

FIG. 2B illustrate printing apparatus 20 shown in FIG. 2A with addition of a reservoir 212C and 212D, holding a nanocomposite-ink 222C and 222D, a feed-line 214C and 214D, and a printing head 216C and 216D. The additional printing heads provide additional nanocomposite-ink different from the nanocomposite-ink in other printing heads. For instance, one of the reservoirs can hold the nanocomposite-ink with one concentration of the nanofillers, another can hold the nanocomposite-ink with a different concentration of the nanofillers, yet another can hold the nanocomposite-ink with a different type of the nanofillers, last one can hold an organic-host material without nanofillers. The nanofillers and the organic-host can be chosen for other properties such as dielectric strength, thermal conductivity, electrical conductivity, coefficient of thermal expansion, or mechanical stability. Further, reservoirs can isolate the nanofillers and the organic-host and mix on demand for various nanofillers concentrations from any one of the printing heads.

Figure 2C:
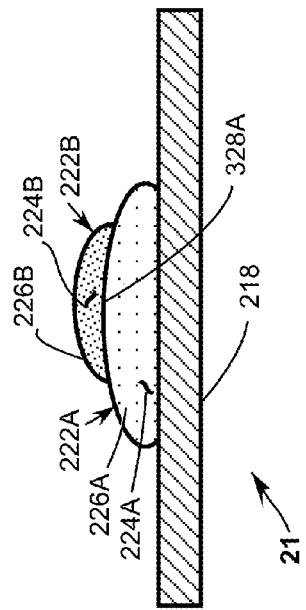
FIG. 2C is a cross-section view, schematically illustrating nanocomposite-ink deposited on a substrate.

FIG. 2C schematically illustrates further detail of the deposition of the nanocomposite-ink shown in FIGS. 2A and 2B. Nanocomposite-ink 222A, deposited on substrate 218 is bounded by a nanocomposite-air interface 226A. The nanocomposite-ink consists of the organic-matrix with dispersed nanofillers 224A throughout the organic-matrix. The organic-matrix is ink-jet printable, optically clear, photo-curable resin. Four non-limiting examples of printable organic-matrix material for are cyanoethyl pullulan (CYELP), polyacrylate, hexanediol diacrylate (HDODA), polymethyl methacrylate (PMMA), diethylene glycol diacrylate (DEGDA), cellulose, and organic resins such as from the SU-8 series resists. The nanofillers are preferably sized sufficiently small with respect to light wavelengths, for those wavelengths intended for use, not to scatter the light. Some nonlimiting examples of nanofillers include The nanocomposite-inks can be different by the nanofiller type, the organic-host matrix type, or concentration of the nanofillers and combinations thereof. Non-limiting examples of nanofillers include beryllium oxide (BeO), aluminum nitride (AlO), silicon carbide (SiC), zinc oxide (ZnO), zinc sulfide (ZnS), zirconium oxide (ZrO), yttrium orthovanadate ($YVO_4$), titanium oxide ($TiO_2$), copper sulfide ($CuS_2$), cadmium selenide (CdSe), lead sulfide (PbS), molybdenum disulfide ($MoS_2$) and silicon dioxide ($SiO_2$) including those with core, core-shell, and core-shell-ligand architectures. The refractive-index within the optical-element can be modified by the nanocomposite-ink used. The nanocomposite-ink can be tuned by the organic-matrix type, the nanofiller type, and the concentration of the nanofillers in the organic-matrix. The refractive-index of a nanocomposite-ink will be the summation by percent volume of the optical properties of the organic-matrix, or organic-host, and the nanofillers. Concentration by volume of the nanoparticles to the organic-host can be about 0.25% to about 70% volume, depending on desired properties. Various examples of nanoparticle and organic-matrix combinations and chemistries is described in PCT Pat. Application No. 2014036660, assigned to the assignee of the present disclosure and the complete disclosure of which is hereby incorporated by reference in its entirety. Additionally, the nanocomposite-ink can be chosen and the optical-element structured to compensate chromatic aberration or increase chromatic dispersion, see U.S. patent application Ser. No. 14/278,164, assigned to the assignee of the present disclosure and the complete disclosure of which is hereby incorporated by reference in its entirety. Further, optically nonlinear (NLO) nanofillers can be utilized in the optical-element and implemented to achieve optically nonlinear effects for applications which require optical limiting, see U.S. patent application Ser. No. 14/293,574, assigned to the assignee of the present disclosure and the complete disclosure of which is hereby incorporated by reference in its entirety.

Figure 2D:
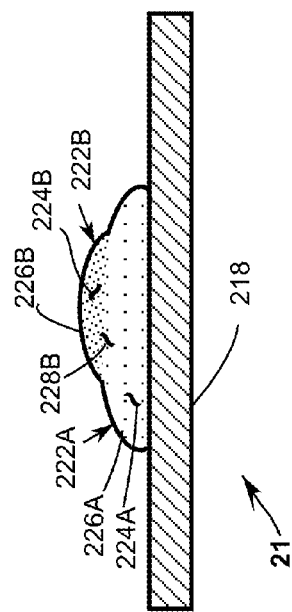
FIG. 2D is a cross-section view, schematically illustrating an additional deposit of nanocomposite-ink.

FIG. 2D schematically illustrates the nanocomposite structure 21 shown in FIG. 2C with an additional deposit of a nanocomposite-ink 222B at a voxel above the voxel of nanocomposite-ink 222A. Here, nanocomposite-ink 222B is shown after deposition, characterized by a dispersed nanofillers 226B, an ink-ink interface 228A (where mixing between nanoparticle-inks has not yet occurred), and an air-ink interface 226B.

Figure 2E:
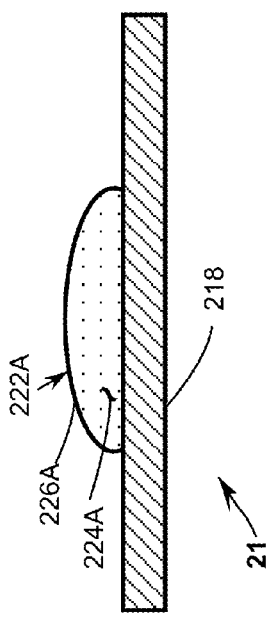
FIG. 2E is a cross-section view, schematically illustrating the resultant nanocomposite from the diffusion or convective mixing of nanofillers from the first and the second nanocomposite-ink as shown in FIG. 2D.

FIG. 2E schematically illustrates the nanocomposite structure 21 as that shown in FIG. 2D, wherein the selective-curing of nanocomposite-ink 222A before deposition of nanocomposite-ink 222B was zero-curing. A nanocomposite-ink 230 is the resultant mixture of uncured nanocomposite 222A and 222B. Nanocomposite-ink 230 is characterized by an air-ink interface 232 and nanofillers 224A and 224B dispersed within. A refractive-gradient between the top and bottom of nanocomposite-ink 230 depends on convective mixing resulting from relative size, velocities, and nanofiller concentrations between the nanocomposite-inks, any partial-curing of nanocomposite-ink 222A drop before deposition of nanocomposite-ink 222B, the temperature of the substrate, and time allowed for diffusion of nanofillers from nanocomposite-inks 222A and 222B, before additional partial-curing of the nanocomposite-inks.

Figure 2F:
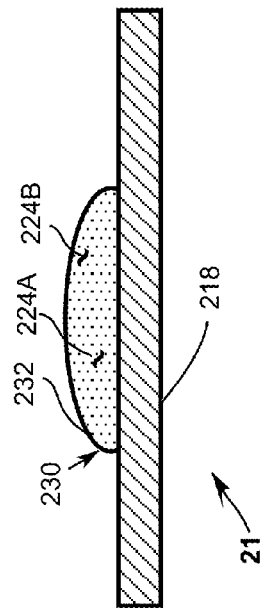
FIG. 2F is a cross-section view, schematically illustrating a resultant refractive-gradient between the first nanocomposite-ink and second nanocomposite-ink from diffusion of nanofillers of the first and second nanocomposite-inks, where the first nanocomposite was partially cured before deposition of the second nanocomposite-ink.

FIG. 2F schematically illustrates the nanocomposite structure of that shown in FIG. 2D wherein nanocomposite 222A was partially cured. Here, partial-cure of nanocomposite 222A results in gradient-area 222B between nanocomposite 222A and 222B. The extent of gradient-area 222B depends on the selective-cure of nanocomposite-ink 222A. Zero-curing allows mixture of the nanocomposite-inks as exemplified in FIG. 2E. Partial-curing allows diffusion in a limited gradient area 228A as exemplified in FIG. 2F. Fully-curing allows little diffusion and results in a substantially ink-ink interface 228A as exemplified in FIG. 2D. In addition to controlling gradient-areas, partial-curing before subsequent deposition reduces stress and strain in the resultant optical-element.

FIG. 2G schematically illustrates the nanocomposite structure 21 shown in FIG. 2A and FIG. 2B where the nanocomposite-ink is deposited side-by-side. Here, nanocomposite-ink 222B with nanofillers 224B and an ink-air interface 226B is deposited along the side of a nanocomposite-ink 222C. Nanocomposite-ink 222C has no nanofillers bound by an air-interface 226C.

FIG. 2H schematically illustrates the nanocomposite structure 21 as shown in FIG. 2G, where nanocomposite-ink 222B has mixed with nanocomposite 222C resulting in a gradient nanocomposite 222D. Here nanocomposite 222D is bounded by an ink-air interface 226D, has a nanofiller 224D, the same nanofillers as nanocomposite-ink 222B, distributed according to a refractive-gradient profile 229B. The gradient is a result of mixture of the nanocomposites where the partial-curing of nanocomposite 222B was minimal and aforementioned convective mixing and time was allowed before further partial-curing. A refractive-gradient profile 229B is characterized by a high refractive-index $n_B$, the high refractive-index due to higher concentration of nanoparticles 224D, the refractive-gradient's refractive-index slowly and smoothly transitioning in the y-direction to a low refractive-index $n_C$, the low refractive-index due to the low concentration of nanoparticles 224D.

FIG. 2I schematically illustrates the nanocomposite structure 21 as shown in FIG. 2G, where nanocomposite-ink 222B has been partially-cured before deposition of nanocomposite-ink 222C. Here partial-cure of nanocomposite-ink 222B, results in limited mixing of nanocomposite-ink 222C at an interface 224AB, resulting in a refractive-gradient 229C. Refractive-gradient profile 229C is characterized by high refractive-index $n_B$, the high refractive-index due to higher concentration of nanoparticles 224D, the refractive-gradient's refractive-index unchanging in the y-direction until quickly transitioning to low refractive index $n_B$ at former interface 224AB. Alternatively, refractive-gradient profile 229C could be produced without partial-curing of nanocomposite-ink 222B, before deposition of nanocomposite 222C, by limiting the aforementioned mixing factors, such as controlling nanocomposite-ink deposition velocities, and limiting diffusion temperature control of the substrate, and curing the deposited nanocomposite-inks within a controlled time.

FIG. 2J schematically illustrates another nanocomposite-ink mixing method. A nanocomposite-ink 226B and a nanocomposite-ink 226C are deposited such that the respective printing heads are aligned to cause the nanocomposite-ink to mix in air creating a nanocomposite-ink 222E. Nanocomposite-ink 222E, then deposits, mixed, onto substrate 118 with a nanofillers 224E bounded by an ink-air interface 226B.

Figure 3A:
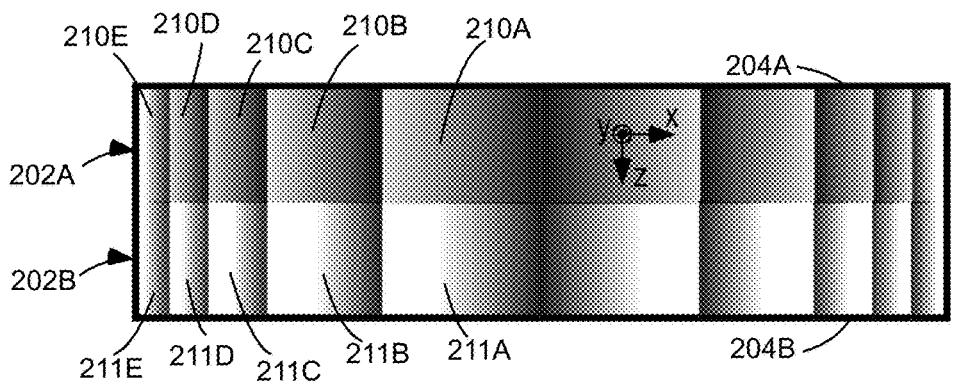
FIG. 3A is a cross-section view schematically illustrating a 2-layer positive optical-element in accordance with the present disclosure.

FIG. 3A schematically illustrates a two layer optical-element 31 in accordance with the present disclosure. Optical-element 31 has a first surface 204A and a second surface 204B bounding a layer 202A and 202B. Layer 202A comprises of a plurality of refractive-gradients 210A, 210B, 210C, 210D, and 210E. Layer 202B comprises of a plurality of refractive-gradients 211A, 211B, 211C, 211D, and 211E. The plurality of refractive-gradients in both of the layers each having radially increasing nanofiller concentration.

Figure 3B:
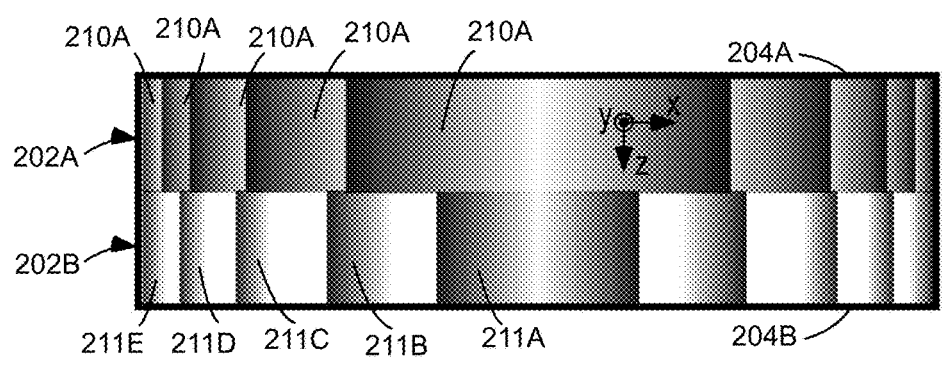
FIG. 3B is a cross-section view schematically illustrating a 2-layer negative optical-element in accordance with the present disclosure.

FIG. 3B schematically illustrates a two layer optical-element 32 in accordance with the present disclosure. Optical-element 32 is similar to optical-element 31 as that shown in FIG. 3A except the plurality of refractive-gradients each have radially decreasing nanofiller concentration.

Figure 3C:
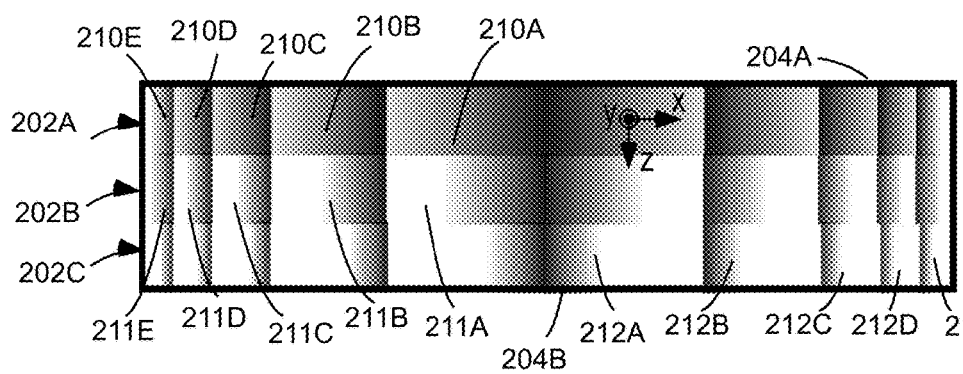
FIG. 3C is a cross-section view schematically illustrating a 3-layer positive optical-element in accordance with the present disclosure.

FIG. 3C schematically illustrates a three layer optical-element 33 in accordance with the present disclosure. Optical-element 33 has a first surface 204A and a second surface 204B bounding a layer 202A, 202B, and 202C. Layer 202A comprises of a plurality of refractive-gradients 210A, 210B, 210C, 210D, and 210E. Layer 202B has a plurality of refractive-gradients 211A, 211B, 211C, 211D, and 211E. Layer 202C comprises of refractive gradients 212A, 212C, 212C, 212D, and 212E. The plurality of refractive-gradients in all the layers each having radially increasing nanofiller concentration.

Figure 3D:
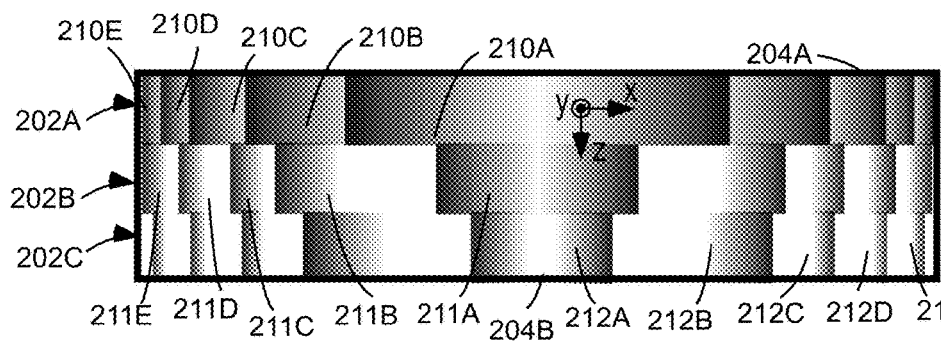
FIG. 3D is a cross-section view schematically illustrating a 3-layer negative optical-element in accordance with the present disclosure.

FIG. 3D schematically illustrates a two layer optical-element 34 in accordance with the present disclosure. Optical-element 34 is similar to optical-element 33 as that shown in FIG. 3C having the same features, except the plurality of refractive-gradients each have radially decreasing nanofiller concentration.

Figure 4A:
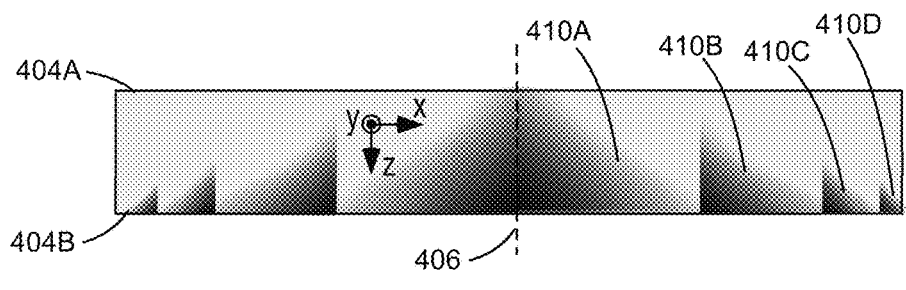
FIG. 4A, FIG. 4B, FIG. 4C and FIG. 4D are cross-section views schematically illustrating possible profiles of the refractive-gradients within the optical-element in accordance with the present disclosure.
Figure 4B:
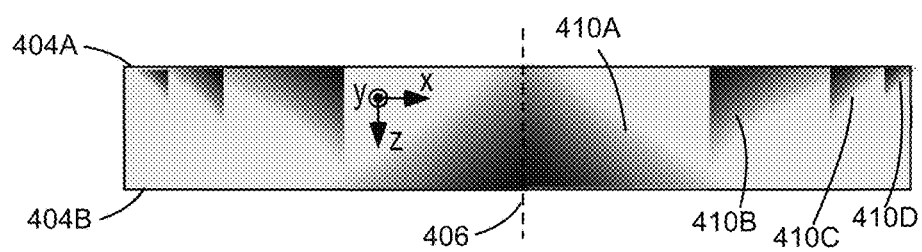
Figure 4C:
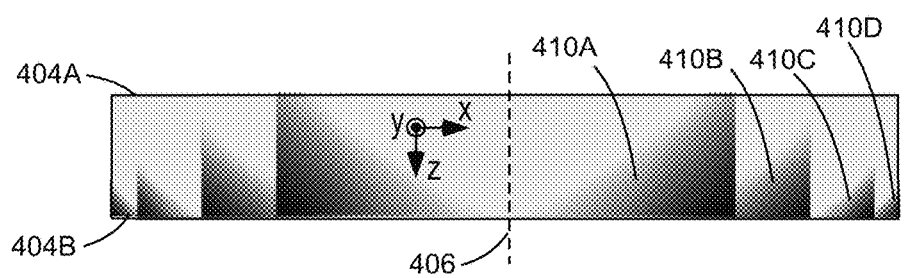
Figure 4D:
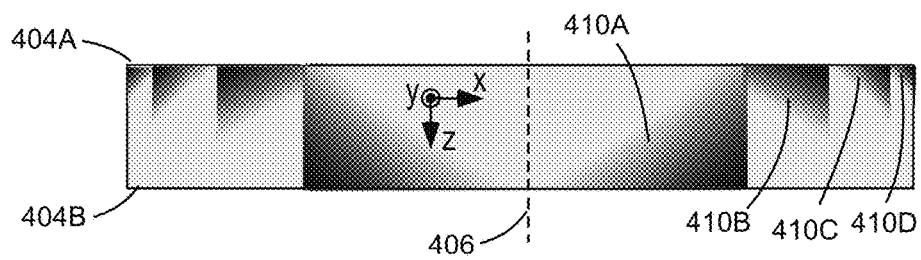

FIG. 4A, FIG. 4B, FIG. 4C, and FIG. 4D schematically illustrate possible arrangements of the plurality of refractive-gradients within the optical-elements in accordance with the present disclosure. FIG. 4A is a cross-section view of optical-element 41. Optical-element 41 is characterized by a first surface 404A and a second surface 404B with the nanocomposite between comprising a plurality of refractive-gradients 410A, 410B, 410C, and 410D symmetric centered about an optical-axis 406. Refractive-gradients 410A, 410B, 410C, and 410D each have concentration of the nanofillers, and respective refractive-index profiles, that both decrease radially from the optical-axis and increase from a first surface 404A to a second surface 404B. FIG. 4B is a cross-section view of an optical-element 42. Optical-element 42 is similar to optical-element 41 as that shown in FIG. 4A, except refractive-gradients 410B, 410C, and 410D each have concentration of the nanofillers decreasing from first surface 404A to second surface 404B. FIG. 4C is a cross-section view of an optical-element 43. Optical-element 43 is similar to optical-element 41 as that shown in FIG. 4A, except that the plurality of refractive-gradients, each have concentration of nanofillers that both increase radially from optical-axis 406 and increase from first surface 404A to second surface 404B. FIG. 4D is a cross-section view schematically illustrating optical-element 44. Optical-element 44 is similar to optical-element 43 as that shown in FIG. 4C, except refractive-gradients 410B, 410C, and 410D each have concentration of the nanofillers both increasing radially from the optic-axis and decreasing from first surface 404A to second surface 404B.

Figure 5A:
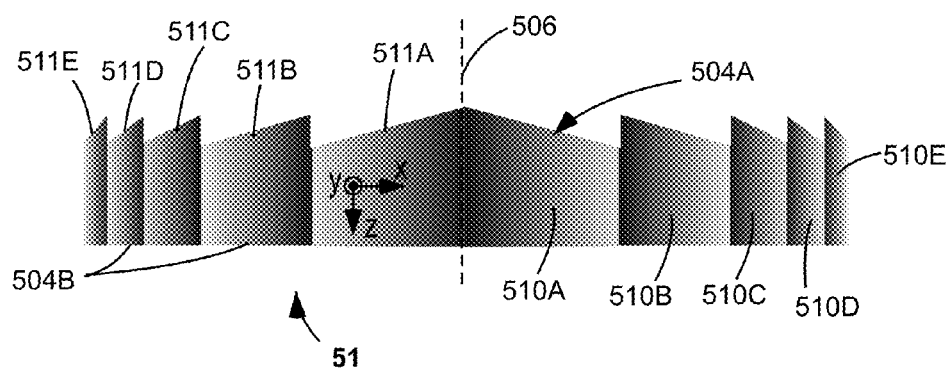
FIG. 5A is a cross-section view, schematically illustrating the positive optical-element where the first surface is a Fresnel surface.
Figure 5B:
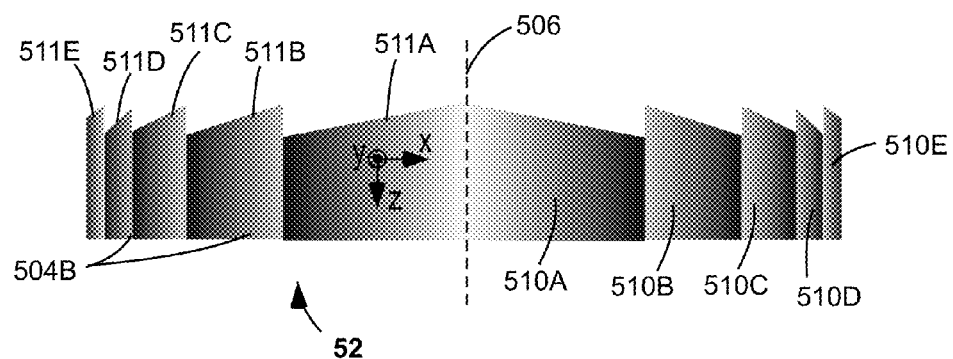
FIG. 5B is a cross-section view, schematically illustrating the negative optical-element where the first surface is a Fresnel surface, in accordance with the present disclosure.

FIG. 5A and FIG. 5B schematically illustrate the optical-element where the first surface is a Fresnel surface. FIG. 5A is a cross-section view of an optical-element 51. Optical-element 51 has a first surface 504A and a second surface 504B with a plurality of refractive-gradients 510A, 510B, 510C, 510D, and 510E, between the surfaces. The refractive-gradients are each have concentration of nanofillers decreasing from an optical-axis 506. Here first surface 504A is a Fresnel surface with a plurality of annular sections 511A, 511B, 511C, 511D, and 511E corresponding to the respective refractive-gradients. Surface 504A has annular sections tapered inward thereby increasing the positive optical power of the optical-element. The Fresnel surface can be made by a variety of techniques. Methods of implementing a Fresnel surface on one of the surface of the optical-element include deposition of the features when ink-jet printing, CNC processing with single-point diamond turning, utilizing the aforementioned mold substrate, or fluid-jet polishing. FIG. 5B is a cross-section view of an optical-element 52. Optical-element 52 is similar to optical-element 51 as that shown in FIG. 5B, except that the plurality of refractive-gradients have nanofiller concentration increasing radially from optical-axis 506.

Figure 6A:
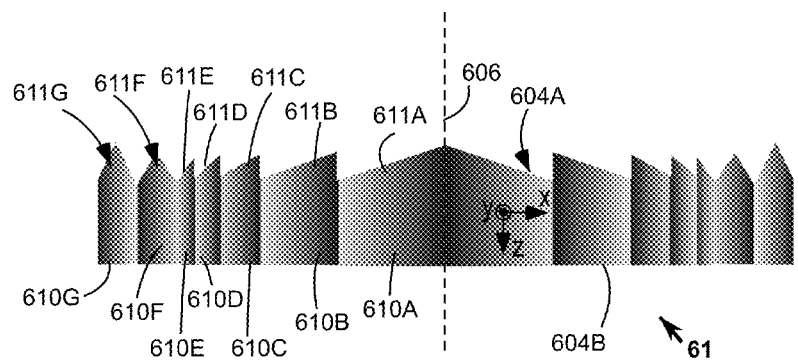
FIG. 6A is a cross-section view, schematically illustrating the optical-element where the first surface is a Fresnel surface, and the Fresnel surface has prismatic section allowing for collection of high oblique angle light rays, in accordance with the present disclosure.
Figure 6B:
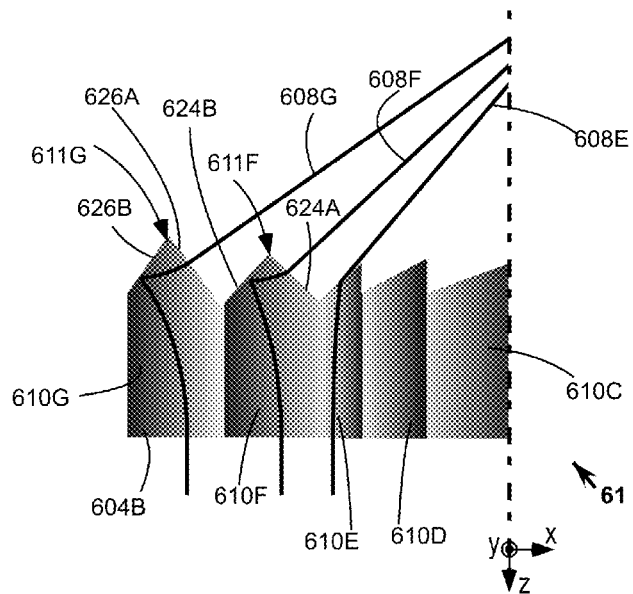
FIG. 6B is a cross-section view, detailing that shown in FIG. 6A.

FIG. 6A and FIG. 6B schematically illustrate an optical-element 61 in accordance with the present disclosure. Optical-element 61 is characterized by a first Fresnel surface 604A and a second surface 604B with the nanocomposite between the surfaces. The nanocomposite comprising a plurality of refractive-gradients 610A, 610B, 610C, 610D, 610E, 610F and 610G symmetric about an optical-axis 606. First surface 604A has a plurality of annular sections 611A, 611B, 611C, 611D, 611E, 611F, and 611F, where annular sections 611A-611E are substantially the same as annular section 511A-511E as that shown in FIG. 5A-5B. Here, an additional annular section 611G and 611F are prismatic, allowing for total internal reflection of high angle, or oblique, light rays.

Referring to FIG. 6B, a detail cross-section view of optical-element 61, including refractive-gradients 610C-610G and accompanying surfaces. A ray 608E refracts at annular section 611E into refractive-gradient 610E, propagating through the refractive-gradient and exiting at surface 604B. Ray 608F propagates towards the optical-element at an oblique angle such that the refractive-gradient, nor a tapered-in annular surface, would be able to turn the ray parallel, nor focus the ray towards, the optical-axis. Ray 608F is incident on annular section 611F. Annular 611F is a prismatic annular section comprising a surface 624A and 624B. Ray 608F enters the optical-element via prismatic section 624A at a near 0 degree incident angle such that little reflection occurs. Ray 608F, guided by refractive-gradient 610F, propagates towards annular surface 624B such that the angle of incidence is high than the critical angle and the ray totally internally reflects and propagates thought the refractive-gradient and exiting via second surface 604B substantially parallel to the optical-axis.

Likewise, a ray 608G is incident on annular section 611G. Annular 611G is a prismatic annular section comprising a surface 626A and 626B. Ray 608G enters the optical-element via prismatic section 624A at a near zero degree incident angle such that little reflection occurs. Ray 608G, guided by refractive-gradient 610G, propagates towards annular surface 626B such that the angle of incidence is high than the critical angle and the ray totally internally reflects and propagates through the refractive-gradient and exiting via second surface 604B substantially parallel to the optical-axis.

The optical-element and various embodiments described have a variety of useful utilities and applications. In general, the optical-element described herein can replace other refractive based optics in applications including confocal and afocal optical systems. For example, the optical-element can be used as a condenser, gathering light over a large area and focusing for illumination applications or solar concentration applications. Alternatively, the optical-element can be used to collect and direct light from high numerical aperture sources, such as lamps and LEDS.

From the description of the present disclosure provided herein one skilled in the art can design the optical-element and implement them in the described applications in accordance with the present disclosure. Those skilled in the art to which the present disclosure pertains will recognize that while above-described embodiments of the inventive optical-element and method of manufacture are exemplified using particular configurations, others may be used without departing from the spirit and scope of the present disclosure. The embodiments explained above assume symmetry around the optical-axis, one skilled in the art will recognize that radial symmetry is not a requirement recognizing off-axis, anamorphic, and cylindrical optical-elements can made with the disclosed techniques. Further, combinations of the various described embodiments and the combinations of refractive-gradients described in those embodiments can be implemented.

In summary, the present invention is described above in terms of particular embodiments. The invention, however, is not limited to the embodiments described and depicted herein. Rather, the invention is limited only by the claims appended hereto.

What is claimed is:

1. A nanocomposite optical-element comprising:
   a first surface, wherein the first surface is a Fresnel surface;
   a second surface; and
   a nanocomposite between the first and the second surface, the nanocomposite comprising of a plurality of refractive-gradients, the plurality of refractive-gradients comprising one or more nanofillers dispersed in a cured organic-matrix, the nanofillers concentration varying in three dimensional space defined by mutually orthogonal x-axis, y-axis, and z-axis, profiles of the plurality of refractive-gradients contributing to overall optical power of the optical-element as a whole, and a profile discontinuity exists between any of the plurality of refractive-gradients that are adjacent, wherein the plurality of refractive-gradients have either a radially increasing, or decreasing, refractive-index profile relative to an optical-axis, and each of the plurality of refractive-gradients also varying in respective cross-section profiles along the z-axis.

2. The optical-element of claim 1, wherein the optical-element has positive optical power.

3. The optical-element of claim 1, wherein the optical-element has negative optical power.

4. The optical-element of claim 1, wherein the nanofiller concentration of each of the plurality of refractive-gradients decreases radially from the optical-axis.

5. The optical-element of claim 1, wherein the nanofiller concentration of each of the plurality of refractive-gradients increase radially from the optical-axis.

6. The optical-element of claim 1, wherein the nanofiller concentration of some of the plurality of refractive-gradients increase radially from the optical-axis.

7. The optical-element of claim 1, wherein the plurality of refractive-gradient profiles are symmetric about an axis transverse to the optical-axis.

8. The optical-element of claim 1, wherein the plurality of refractive-gradients are layered in a plane, transverse to the optical-axis.

9. The optical-element of claim 1, wherein the plurality of refractive-gradients are symmetric with respect to the optical-axis.

10. The optical-element of claim 1, wherein the optical-element is centrosymmetric with respect to the optical-axis.

11. The optical-element of claim 1, wherein the optical-element has bilateral symmetry with respect to a plane transverse to the optical-axis.

12. The optical-element of claim 1, wherein each of the plurality of refractive-gradients are concentric annular sections.

13. The optical-element of claim 1, wherein the plurality of refractive-gradients are positioned asymmetrically.

14. The optical-element of claim 1, wherein the nanofiller concentration, of one or more of the plurality of refractive-gradients, is not linear with respect to distance from the optical-axis.

15. The optical-element of claim 1, wherein at least one of the refractive gradients is designed to cause total internal reflection at one of the discontinuities.

16. The optical-element of claim 1, wherein the Fresnel surface is positive.

17. The optical-element of claim 1, wherein the Fresnel surface is negative.

18. The optical-element of claim 1, wherein the Fresnel surface is optimize to face a finite-conjugate.

19. The optical-element of claim 1, wherein the Fresnel surface is optimized to face an infinite-conjugate.

20. The optical-element of claim 1, wherein the Fresnel surface is optimized for total internal reflection of incoming light rays at oblique angles.

21. The optical-element of claim 1, wherein the Fresnel surface is aspherically contoured.

22. The optical-element of claim 1, wherein the Fresnel surface is cylindrically contoured.

23. The optical-element of claim 1, further comprising a substrate.

24. The optical-element of claim 1, wherein the plurality of refractive-gradients have two or more of the nanofillers to control chromatic dispersion.

25. The optical-element of claim 24, wherein chromatic dispersion is proportional to the optical power of the optical-elements.

26. The optical-element of claim 24, wherein a ratio of an Abbe-number of the nanofillers is proportional to the optical power of the optical-element.

27. The optical-element of claim 24, wherein the chromatic dispersion of the optical-element increases axial focusing distance between two or more wavelengths of light.

28. The optical-element of claim 24, wherein the chromatic dispersion of the optical-element decreases axial focusing distance between two or more wavelengths of light.

29. The optical-element of claim 24, wherein the chromatic dispersion increases divergence angle between two or more wavelengths of light.

30. The optical-element of claim 1, wherein the nanocomposite includes at least one type of an optically nonlinear nanofiller.

* * * * *